July 23, 1940.　　　O. M. EDWARDS　　　2,208,836
WINDOW CONSTRUCTION
Filed March 4, 1938　　　2 Sheets-Sheet 1
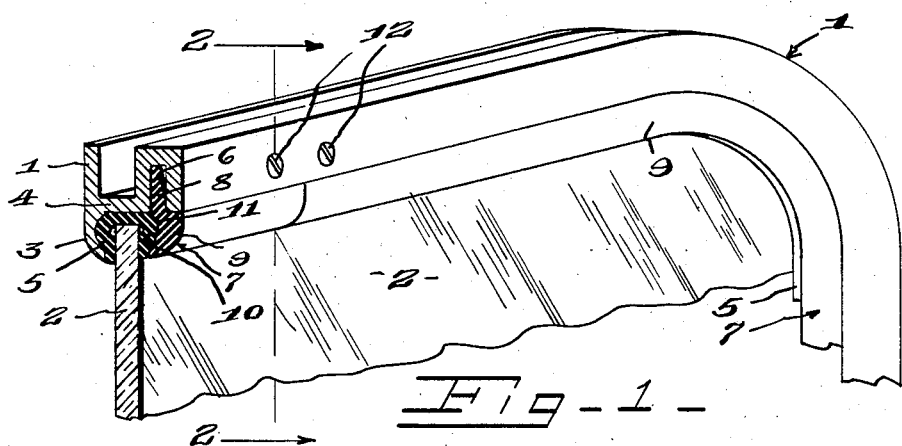
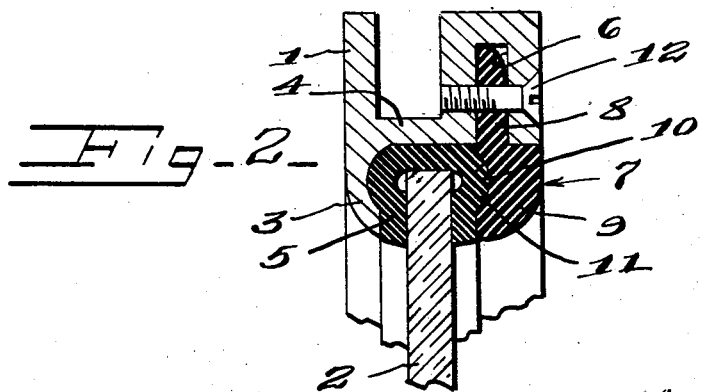
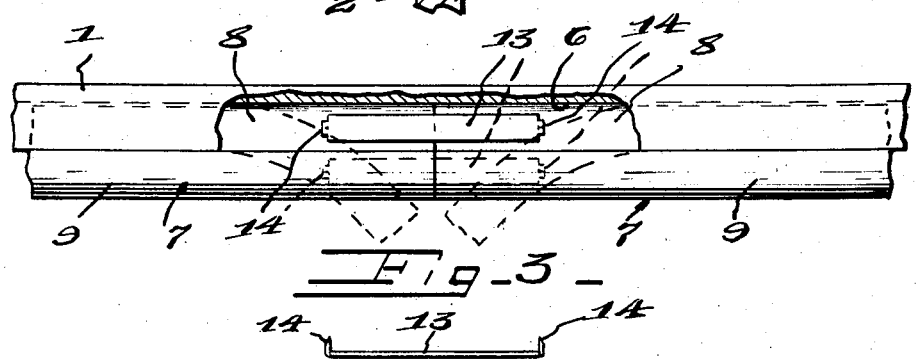
INVENTOR.
BY Oliver M. Edwards
Boddell & Thompson
ATTORNEYS.

July 23, 1940.  O. M. EDWARDS  2,208,836
WINDOW CONSTRUCTION
Filed March 4, 1938   2 Sheets-Sheet 2
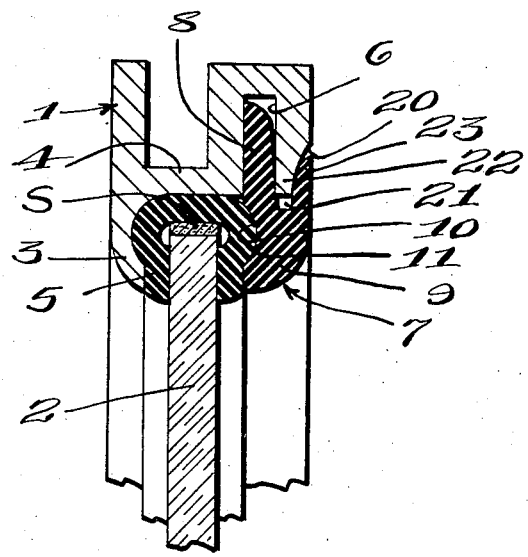
Fig-5-
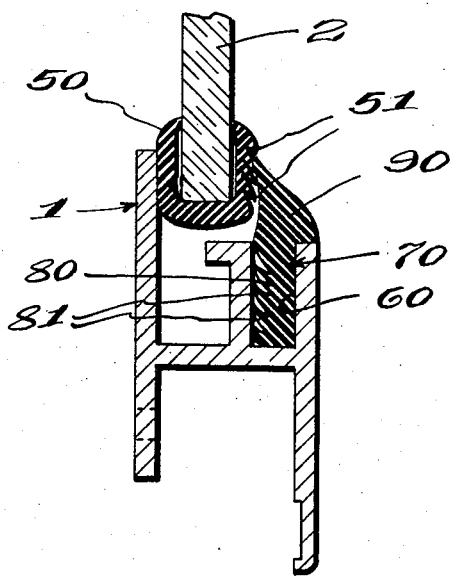
Fig-6-
INVENTOR.
BY Oliver M. Edwards
Bodell & Thompson.
ATTORNEYS.

Patented July 23, 1940

2,208,836

UNITED STATES PATENT OFFICE 2,208,836

WINDOW CONSTRUCTION

Oliver M. Edwards, Syracuse, N. Y., assignor to The O. M. Edwards Company, Inc., Syracuse, N. Y., a corporation of New York Application March 4, 1938, Serial No. 193,972

2 Claims. (Cl. 189—78)

This invention relates to window constructions, particularly windows for vehicles, railway cars, and other structures, and has for its object a particularly simple, economical and compact construction by which the glass can be readily installed in a frame and removed and replaced.

It further has for its object an arrangement of a retaining strip which interfits with the frame around the glass in an edgewise direction to prevent unintentional transverse displacement and also which interfits with a circumferential member around the glass to prevent unintentional displacement of the retaining strip inwardly in a direction edgewise or parallel to the plane of the window, that is, displacement of the retaining strip out of its interfitting engagement with the frame around the glass.

The invention consists in the novel features and in the combinations and constructions hereinafter set forth and claimed.

In describing this invention, reference is had to the accompanying drawings in which like characters designate corresponding parts in all the views.

Figure 1 is a fragmentary isometric view of a window structure embodying this invention.

Figure 2 is an enlarged transverse sectional view on line 2—2, Figure 1.

Figure 3 is a fragmentary detail view of a modified feature of the window construction.

Figure 4 is a detail view of the clip shown in Figure 3.

Figure 5 is a view similar to Figure 2 of a slightly different exemplification of the invention.

Figure 6 is a view similar to Figure 2 of another modification of the invention.

1 designates the frame or any structure for receiving a glass. 2 designates the window glass mounted in the frame. The frame 1 is formed with an internal circumferential recess, angular in cross-section, and having a side wall 3 forming one side of a channel for receiving the glass, and a bottom 4. The other side of the channel is formed by a retaining strip to be presently described.

The glass 2 here shown is provided with a marginal frame member 5 having a groove for receiving the margin of the glass. This frame member is in the form of a channel and includes a channel-shaped part of resilient compressible material in the channel of the frame 1 and which coacts with the side wall 3, bottom 4 and the retaining strip to be described.

In the illustrated embodiment of my invention, the frame member in its entirety is formed of resilient compressible material, as rubber.

The frame member 5 is U-shaped in cross-section, or in the form of a channel and encircling the margin of the glass pane, the member 5 engaging the side wall 3 and the bottom 4 of the frame 1.

The frame 1 is formed with an inwardly facing groove 6 located out of the plane of the window and beyond the edge of the glass and being substantially parallel to the plane of the window, it being parallel in order to facilitate the insertion of the retaining strip or the base flange thereof.

7 designates the retaining strip, this having a circumferential base flange 8 for interfitting in the groove 6. The groove 6 and the flange 8 constitute interfitting means on the retaining strip and the frame 1 arranged to prevent unintentional transverse displacement of the retaining strip. The retaining strip also includes a head or bead portion 9 coacting with the adjacent side of the frame member 5. The adjacent side of the frame member 5 and the head 9 of the retaining strip are formed with interfitting means arranged to prevent inward or edgewise unintentional displacement of the retaining strip out of the groove 6. As here shown, the head 9 is formed with a lengthwise groove 10 for receiving a rib 11 on the adjacent side of the member 5 interfitting in the groove. The rib and groove are preferably rounded. Likewise, the side 3 of the channel and the contiguous side of the member 5 are preferably interlocked in a similar manner.

The retaining strip is preferably of resilient compressible flexible material, as rubber, which, after the window is placed in position, is step by step interlocked in the groove 6 and with the member 5, that is, the retaining strip is inched into position and so placed that the abutting ends come close together. In order to permanently hold the abutting ends together against the displacement due to creeping or crawling of the retaining strip, screws, as 12, may be provided extending through the window frame and into the base flange 8 of the retaining strip near the abutting ends of the retaining strip, or, as seen in Figure 3, a flat clip 13 may be provided having prongs 14. When the glazing strip is placed in position, the abutting ends may be pulled outward sufficiently to place the clip lapping the flange 8 at the abutting ends with the prongs thereof hooked into the abutting ends, and then the ends pressed down with the clip thereon into the groove 6.

In window structures where the sash is slidable or can be opened and closed or raised and lowered, the frame 1, member 5 and strip 7 may be considered a compound sash consisting of the three parts 1, 5 and 7. In window structures that are stationary, that is, can not be raised and lowered, the frame 1 might be considered the window frame and the member 5 the sash. When the sash is slidable, the rounding corners are squared as shown at 15 (Figure 1).

In placing the glass in position, the member 5, which is an endless band, is placed on the glass pane and is or may be under tension. The glass with the element 5 thereon is then placed in the frame 1; then the retaining strip placed in position. In order to replace broken glass or for any other purpose, the retaining strip may be readily removed by displacing one end out of the groove 6 and then pulling the strip out of the groove. After the glass with the member 5 thereon has been replaced, the retaining strip may be replaced, as before described.

Owing to the groove 6 being parallel to the plane of the sash, the retaining strip may be easily placed in position, and further owing to the interfit between the retaining strip and adjacent wall of the member 5, the retaining strip is held from inward displacement, particularly at the rounding corners of the frame 1, where it would otherwise loop inwardly out of the groove 6.

In the construction shown in Figure 2, the circumferential member 5 is intended to fit accurately in the frame 1, so as to interfit with the side wall 3 of the channel. Hence, when the retaining strip 7 is placed in position and the head 9 thereof interfitted with the retaining member, there is no tendency due to shifting of the glass panel, and hence of the circumferential member 5 to work or shift the retaining strip relatively to the frame or in an edgewise direction out of the groove 6. However, glass panels intended to be the same size vary slightly in size and do not fit accurately in the groove of the circumferential member 5, so that a tendency might develop for the member 5 to shift with the glass, particularly if the circumferential member is under tension around the glass, and cause the retaining strip 7 to shift slightly leaving a gap between the head 9 of the retaining strip and the edge of the frame 1. Therefore, as seen in Figure 5, in order to eliminate this gap, the edge of the wall of the frame 1 on the outer side of the groove 6 is provided with a rabbet 20 and the head 9 of the retaining strip formed with a groove 21 for receiving the margin 22 of the wall of the frame 1 at the outer side of the groove 6, and also with a flange or rib 23 extending into the rabbet 20. Thus, in this construction, if the circumferential member 5 does shift, and in so doing shifts the retaining strip 7, because the head of said strip being interlocked with the member 5, the flange 23 will close the gap.

When the glass is slightly undersize, the circumferential member 5 may be placed around the glass but not under tension, so that the retaining member will accurately interfit in the channel of the frame 1 and the head 9 of the retaining strip will accurately interfit with the retaining member and not be subject to any shifting tendency of the glass panel in the circumferential member or a shim or spacer strip S may be placed on the bottom of the groove to compensate for variation in the size of the glass, and the circumferential member may or may not then be under tension.

If a shim is not used and the glass is undersize, any shifting of the glass is inconsequential as it is cushioned on the circumferential member 5 and also is tightly held, or, in other words, is in airtight relation to the frame 1 and the retaining strip 7, this being of importance in double windows having an air space between them.

In Figure 6, in order that the circumferential member 50 may interfit with the retaining strip 70 and hold the retaining strip 70 from moving out of its groove 60, the head 90 of the retaining strip and the adjacent wall of the circumferential member 50 are interfitted by means of a plurality of lengthwise barbs or corrugations 51, preferably formed on the adjacent side of the circumferential member 50, and any one coacting with the head 90, so that the retaining strip 70 is held from working out of the groove 60 when once placed in the groove 60, by reason of the interfitting of the head 90 with the corrugations or barbs 51. In Figure 6, the base flange 80 of the retaining strip 70 is also shown as formed with barbs 81 coacting with the side wall of the groove 60 and extending at such inclination as to resist or obstruct working of the retaining strip 70 out of the groove 60. The incline of these barbs 81 is such that any tendency of the retaining strip 70 to work out of the groove causes a slight widening or expansion. To intentionally get the strip out of the groove, one end thereof is pried out of the groove and then upon stretching of the retaining member by pulling on the end, the base flange naturally drawn out or narrowed by the stretching so that the barbs come loose freely. These barbs 81 per se form no part of the invention but are similar to those shown in the application of Edward F. Chaffee, Serial No. 171,528, filed October 28, 1937.

In all forms of the invention, the retaining strip is held from unintentional displacement out of the groove by interlocking with the circumferential member.

What I claim is:

1. The combination of a frame and a glass mounted in the frame, the frame being formed with a circumferential internal recess, angular in cross-section, providing one side and the bottom of a channel, an endless member extending circumferentially around the glass and having a groove for receiving the margin of the glass, said member coacting with the side and bottom of said recess and the side of said recess being formed with a lengthwise groove and the adjacent side of said member having a rib portion interfitting in the groove, the frame being formed with an inwardly facing groove extending in a general direction parallel to the plane of the glass and located out of said plane on the side opposite to that coacting with the side wall of the recess, and a retaining strip of resilient compressible material adjustable relatively to said endless member forming the other side wall of the channel and having a flange extending into said groove, and a head portion pressing against the adjacent side of said member, the head portion being formed with a lengthwise groove on the inner side thereof and the adjacent side of said member having a rib portion interfitting in the last-mentioned groove to prevent unintentional edgewise displacement of the retaining strip out of the groove, and means for holding the abutting ends of said retaining strip from displacement.

2. The combination of a frame and a glass mounted in the frame, the frame being formed with a circumferential internal recess, angular in cross-section, providing one side and the bottom of a channel, a marginal member of compressible resilient material extending circumferentially around the glass and having a groove for receiving the margin of the glass, said member coacting with the side and bottom of said recess, the side of the recess and a contiguous portion of said marginal member having interlocking portions to prevent displacement of the marginal member edgewise out of the recess, a retaining strip of resilient, elastic and compressible material separate from the marginal member and having a base flange interlocking with the frame by edgewise movement relatively to the frame, and a head pressing against the adjacent side of said marginal member, the head and the marginal member being shaped to interlock to hold the retaining strip from edgewise movement out of interlocking engagement with the frame, all whereby the side wall holds the marginal member from inward edgewise movement and the marginal member holds the retaining strip from edgewise displacement, and means for holding the abutting ends of said retaining strip from displacement.

OLIVER M. EDWARDS.